US009093739B2

(12) United States Patent
Hooper et al.

(10) Patent No.: US 9,093,739 B2
(45) Date of Patent: Jul. 28, 2015

(54) DEVICE INCLUDING AN ANTENNA AND METHOD OF USING AN ANTENNA

(75) Inventors: Stephen R. Hooper, Mesa, AZ (US); James D. MacDonald, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 1202 days.

(21) Appl. No.: 12/707,961

(22) Filed: Feb. 18, 2010

(65) Prior Publication Data

US 2011/0201288 A1 Aug. 18, 2011

(51) Int. Cl.
*H04B 1/04* (2006.01)
*H01Q 9/04* (2006.01)

(52) U.S. Cl.
CPC .................................. *H01Q 9/0421* (2013.01)

(58) Field of Classification Search
USPC ................. 455/129, 256; 343/277, 841, 866; 373/895
See application file for complete search history.

(56) References Cited

U.S. PATENT DOCUMENTS 5,740,523 A * 4/1998 Nakajima et al. .......... 455/186.1
6,005,524 A 12/1999 Hayes et al.
6,175,747 B1 * 1/2001 Tanishima et al. ......... 455/562.1
6,255,994 B1 * 7/2001 Saito ...................... 343/700 MS
6,882,316 B2 * 4/2005 McKinzie et al. ...... 343/700 MS
6,937,192 B2 8/2005 Mendolia et al.
7,016,660 B2 * 3/2006 Meijer et al. ............... 455/277.2
7,889,134 B2 * 2/2011 McKinzie et al. ...... 343/700 MS
8,593,367 B2 * 11/2013 Ali et al. ....................... 343/848
2002/0025793 A1 * 2/2002 Meijer et al. ............... 455/277.1
2004/0053582 A1 * 3/2004 Nakanishi et al. ............ 455/101
2007/0096847 A1 * 5/2007 Trutna et al. .................. 333/133
2008/0094290 A1 * 4/2008 Wen et al. ..................... 343/702
2009/0042529 A1 * 2/2009 Lindenmeier et al. ..... 455/277.2

FOREIGN PATENT DOCUMENTS

WO 2004032280 A2 4/2004

OTHER PUBLICATIONS

McKinzie, et al., "Novel Packaging Approaches for Miniature Antennas," presented at the IMAPS/SMTA Conference on Telecom Hardware Solutions, May 15-16, 2002, Plano, TX, 7 pages.
Rosu, Iulian, "PIFA—Planar Inverted F Antenna," printed from <http://www.qsl.net/va3iul> on Jan. 18, 2010, 4 pages.

* cited by examiner

*Primary Examiner* — Wesley Kim
*Assistant Examiner* — Richard Chan

(57) ABSTRACT

An integrated package is disclosed that includes a conductive structure that can be selectively configured to include a radiating element of a planar antenna or to include a radio-frequency shielding structure. Examples of a planar antenna include PIFA antennas, patch antennas, and the like. The planar antenna can be selectively configured to different tuning profiles, and operate as a diversity antenna by alternating its tuning profile configuration amongst different tuning profiles.

20 Claims, 11 Drawing Sheets

| DESCRIPTION | SWITCH(ES) | DIVERSITY 1 CONDUCTIVE STATE | | DIVERSITY 2 CONDUCTIVE STATE | | | |
|---|---|---|---|---|---|---|---|
| SLOW-WAVE CELL 136 | 511/512 | H/H | H/H | H/H | H/H | H/H | H/H |
| SLOW-WAVE CELL 131 | 5111/5121 | H/H | H/H | H/H | L/L | H/H | L/L |
| GAP 555 | 550 | H | H | H | H | H | H |
| GAP 2 556 | N/A | H | H | H | H | H | H |
| SHIELDING | 602 | L | L | L | L | L | L |
| FEED LOC 143 | 141 | H | L | H | H | L | L |
| FEED LOC 153 | 151 | L | H | L | L | H | H |
| CENTER TAP 1 | 411 | L | L | L | L | L | L |
| CENTER TAP 2 | 412 | L | L | L | L | L | L |
| CENTER TAP 3 | 413 | L | L | L | L | L | L |

DEVICE INCLUDING AN ANTENNA AND METHOD OF USING AN ANTENNA

FIELD OF THE DISCLOSURE

The present disclosure relates generally to electronic devices, and more particularly to electronic devices including an antenna.

BACKGROUND

Antennas having small profiles have been developed for use in portable wireless applications. Examples of such antennas include a Planar Inverted-F Antenna (PIFA), a shorted patch antenna, and a meandering line antenna.

BRIEF DESCRIPTION OF THE DRAWINGS

The present disclosure may be better understood, and its numerous features and advantages made apparent to those skilled in the art by referencing the accompanying drawings.

DETAILED DESCRIPTION

In accordance with a specific embodiment of the present disclosure an integrated package is disclosed that includes a planar antenna having a radiating element. Examples of planar antennas include PIFA antennas, patch antennas, and the like. The planar antenna can be selectively configured to different tuning profiles, and operate as a diversity antenna by periodically alternating its configuration amongst the different tuning profiles. Various embodiments of such an integrated package will be better understood with reference to FIGS. 1-14.

Figure 1:
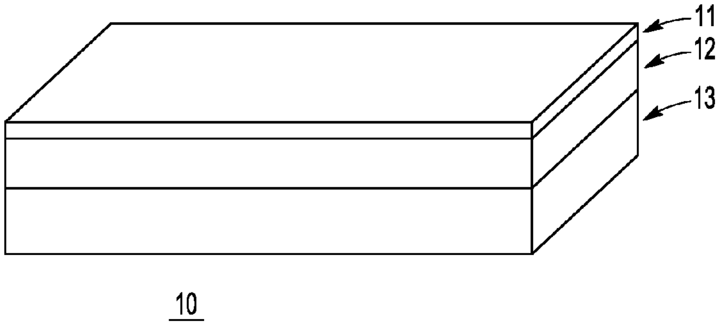
FIG. 1 is a perspective view of an integrated package in accordance with a specific embodiment of the present disclosure.

FIG. 1 illustrates an integrated package 10 including a conductive level 11, an interconnect level 12, and a control level 13. Conductive level 11 includes a conductive structure (not illustrated at FIG. 1) that can be configured by switches at the control level 13 to operate as a radiating element of an antenna to transceive radio-frequency (RF) signals. The conductive structure can also be configured by switches at the control level 13 to operate as an RF shield to reduce RF transmissions to and from portions of the integrated package 10, such as circuitry at control level 13. When the conductive structure is configured to operate as a radiating element, the switches at control level 13 can be controlled to facilitate tuning of an antenna of the integrated package 10, which includes the radiating element, at one of a plurality of tuning profiles. The integrated package 10 illustrated herein is assumed to be a redistributed chip package (RCP). However, it will be appreciated that other types of integrated packages can also be used in accordance with specific embodiments of the present disclosure. For example, other types of integrated packages can include a package with an antenna on a lid that is formed by metal stamping and overmolding, a package with an antenna on a lid formed by flex circuits, an overmolded package with a plated antenna structure on a top surface, which can be interconnected by wire cross sections at the plating interface, and the like.

Figure 2:
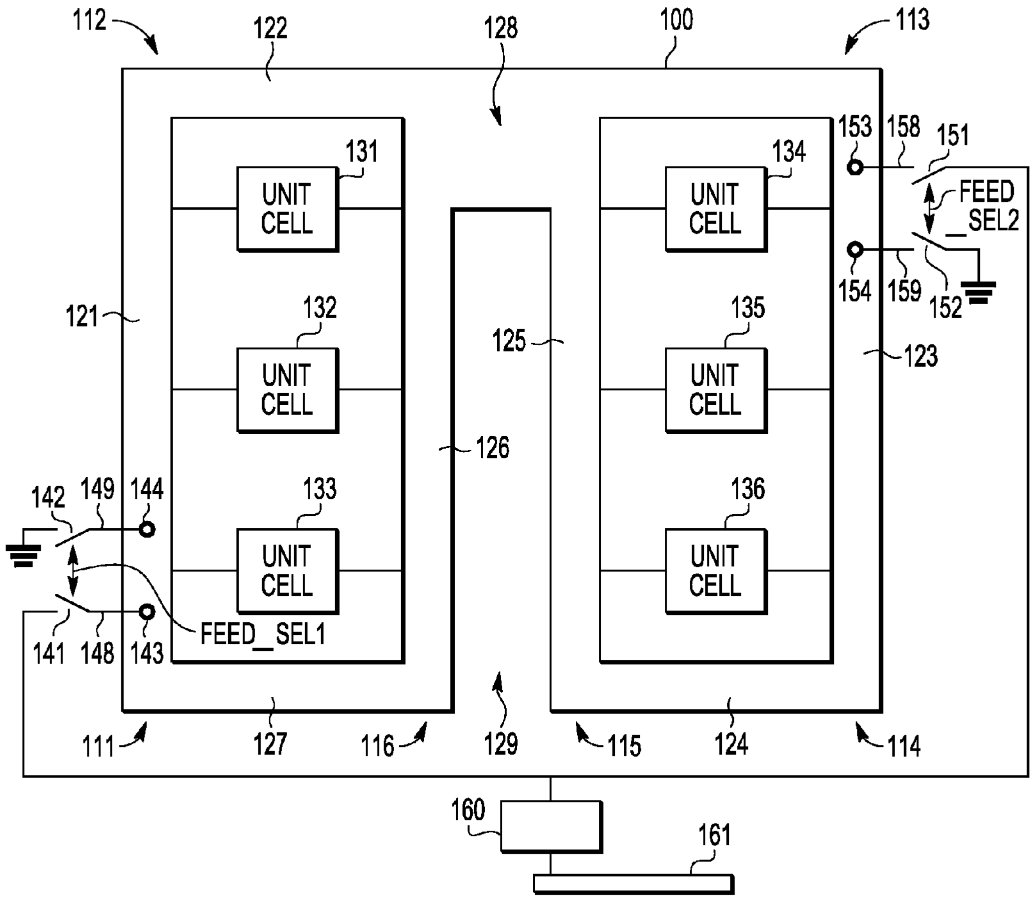
FIG. 2 is a schematic top view of the integrated package of FIG. 1 illustrating a selectable feed location in accordance with a specific embodiment of the present disclosure.

FIG. 2 illustrates a schematic top view of the integrated package 10, including a representative layout of a perimeter trace of a portion of conductive structure 100 at conductive level 11. Other portions of conductive structure 100, and devices at other levels of integrated package 10, are illustrated schematically at FIG. 2. Conductive structure 100 typically includes a metal, though non-metal containing materials capable of electromagnetic radiation as described herein can also be used.

A radiating element of a conductive structure that can be selectively tuned as described herein includes the perimeter trace of conductive structure 100 illustrated at FIG. 2 that includes the following perimeter lines: perimeter line 121 extending from corner 111 to corner 112; perimeter line 122 extending from corner 112 to corner 113; perimeter line 123 extending from corner 113 to corner 114; perimeter line 124 extending from corner 114 to corner 115; perimeter line 125 extending from corner 115 to perimeter line 122; and perimeter line 127 extending from corner 116 to perimeter line 122. The perimeter trace of conductive structure 100 also includes a fill portion 128 that is continuous with perimeter line 122, perimeter line 125, and perimeter line 126. It will be appreciated that the width of the individual perimeter lines can be the same or different, and can be chosen according to design rules and performance goals of a particular antenna. Similarly, the length of a fill portion 128 extending from perimeter line 122 can be chosen according to design rules and performance goals, and can be zero. A gap 129 is formed between metal lines 125, 126, and fill portion 128. Typical overall dimensions for the radiating element of the antenna at the 5-6 GHz Industrial, Scientific and Medical (ISM) frequency band can be about 7 mm×10 mm, while the thickness can be about 18 um. Conductive structure 100, which includes the radiating element, can include Cu and be plated with a highly electrically conductive outer surface, such as NiAu, to provide for adequate skin depth for the propagating electromagnetic waves by the radiating element.

Conductive structure 100 includes a plurality of slow-wave cells 131-136, labeled UNIT CELL, that can be lumped L-C (inductor-capacitor) elements. Slow-wave cells 131-133 are connected between perimeter lines 121 and 126 within an area defined by perimeter lines 126, 127, 121, and perimeter line 122. Slow-wave cells 134-136 are connected between perimeter lines 123 and 125 within an area defined by perimeter lines 122, 123, 124, and 125. One skilled in the art will appreciate that the slow-wave cells effectively reduce the speed at which radio frequency waves propagate along a conductor.

Figure 3:
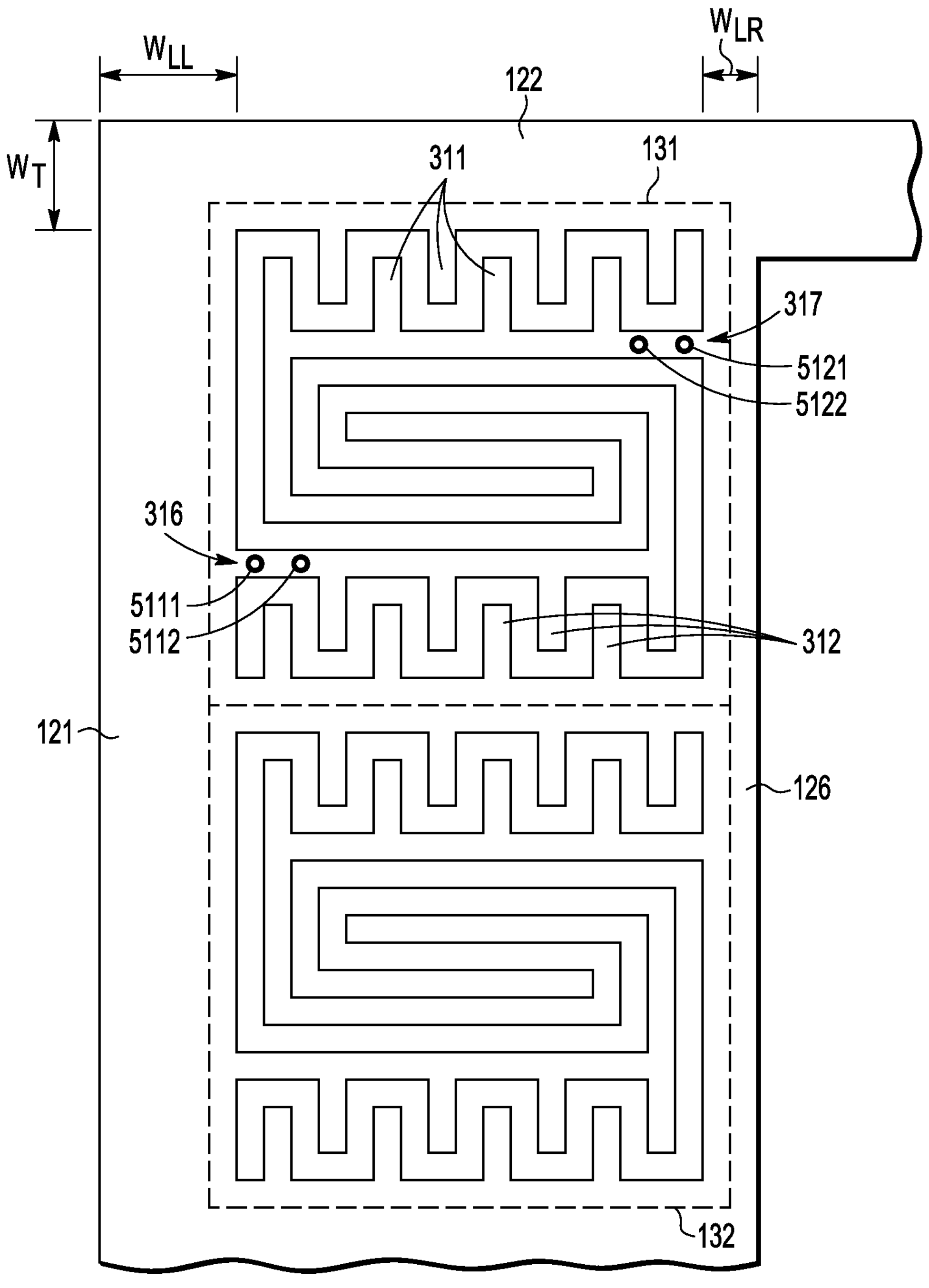
FIG. 3 is a top view of a portion of the integrated package of FIG. 1 illustrating slow-wave cells implemented at a conductive structure in accordance with a specific embodiment of the present disclosure.

Each slow-wave cell implements a lumped L-C element that has the effect of slowing a radio-frequency wave. FIG. 3 illustrates a top view of a specific slow-wave cell layout pattern implemented at slow-wave cell 131 and slow-wave cell 132 as formed at conductive structure 100. The layout pattern of slow-wave cell 131 includes a capacitive structure implemented by inter-digitated conductive fingers, three of which are specifically identified as inter-digitated fingers 311. Another capacitive structure is implemented by inter-digitated conductive fingers, three of which are specifically identified in FIG. 3 as inter-digitated fingers 312. An inductive structure is implemented by a meandering conductive line that is connected to perimeter line 121 at location 316 and meanders to perimeter line 126 where it connects to perimeter line 126 at location 317. It will be appreciated that the slow-wave cells 131-136 can be implemented using the same or different layout pattern as that illustrated at FIG. 3. Note that locations 5111, 5112, 5121, and 5122 illustrated at FIG. 3 are discussed subsequently herein.

Referencing back to FIG. 3, the specific embodiment illustrated is for an antenna implementation at integrated package 10, whereby a signal, referred to as a transceive signal, can be selectively communicated between a control module 160 and one of a signal feed location 143 or a signal feed location 153 of a radiating element implemented at conductive structure 100. In particular, the integrated package 10 of FIG. 2 includes a selectable signal feed 148 connected to selectable feed location 143, and a selectable signal feed 158 connected to selectable feed location 153. Therefore, each one of the plurality of signal feeds is connected to a corresponding signal feed location of a plurality of signal feed locations of the conductive structure 100. A switch 141 includes a first data terminal connected to a terminal of control module 160, a second data terminal connected to signal feed 148, and a control terminal connected to an interconnect that receives a control signal labeled FEED_SEL1, provided by control module 160. A switch 151 includes a first data terminal connected to a terminal of control module 160, a second data terminal connected to the selectable signal feed 158, and a control terminal that is connected to an interconnect that receives a control signal, labeled FEED_SEL2, provided by control module 160.

In addition to a plurality of signal feeds, FIG. 2 also illustrates a plurality of voltage reference feeds that implement RF shorts that correspond to signal feed locations during RF signal transmission. In particular, a switch 142 includes a first data terminal connected to fixed voltage reference, such as a ground, a second data terminal connected to a voltage reference feed 149 that is connected to voltage reference feed location 144 of the conductive structure 100, and a control terminal that is connected to receive the control signal FEED_SEL1. A switch 152 includes a first data terminal connected to a ground voltage reference, a second data terminal connected to a voltage reference feed 159 that is connected to voltage reference feed location 154 of the conductive structure 100, and a control terminal that is connected to receive the control signal FEED_SEL2.

During operation, control module 160, which is implemented at control level 13, can select the feed-end of the antenna to be either the end of conductive structure 100 that is closest to corner 111, or the end that is closest to corner 113. The feed-end to be selected can be based upon a configurable indicator at storage location 161. Storage location 161 can be a volatile or non-volatile storage location. A non-volatile storage location can be capable of being programmed a single time or multiple times. For example, the configurable indicator can be updated dynamically during operation to change a tuning profile of an antenna at the integrated package. The end of the antenna closest to corner 111 is selected as the feed-end of the antenna by the control module 160, responsive to the state of the configurable indicator, by placing switches 141 and 142 in a high-conductivity state and switches 151 and 152 in a high-impedance state, i.e., a low-conductive state. The end of the antenna that is closest to corner 113 is selected as the feed-end of the antenna by the control module 160, responsive to the state of the configurable indicator, by placing switches 151 and 152 in a high-conductivity state and switches 141 and 142 in a high-impedance state.

The ability to select a feed-end of the antenna allows spatial tuning of the antenna at integrated package 10 to compensate for physical orientations of the package that can result in signal blockages, reflections, and nulls at the antenna that cause low signal strengths at a specific signal feed location. Furthermore, the antenna at integrated package 10 can be configured as a spatial diversity antenna by periodically alternating the feed-end of the antenna during operation, thereby reducing the likelihood of a received signal being completely missed due to a weak signal at a specific feed location.

The term “signal feed location” as used herein is intended to refer to a location of the conductive structure 100 that is connected to a signal feed that communicates a transceive signal between the conductive structure 100 and control module 160. The transceive signal communicated via a signal feed can be a signal provided by the control module 160 that is to be radiated, e.g., a signal provided by control module 160 to be transmitted by an antenna implemented at integrated package 10, or the transceive signal can be a radiated signal received at an antenna implemented at integrated package 10 that is to provided to the control module 160. The term “voltage reference feed location” as used herein is intended to refer to a location of the conductive structure 100 that is connected to a voltage reference feed that can provide a fixed voltage reference, such as ground, to conductive structure 100.

Figure 4:
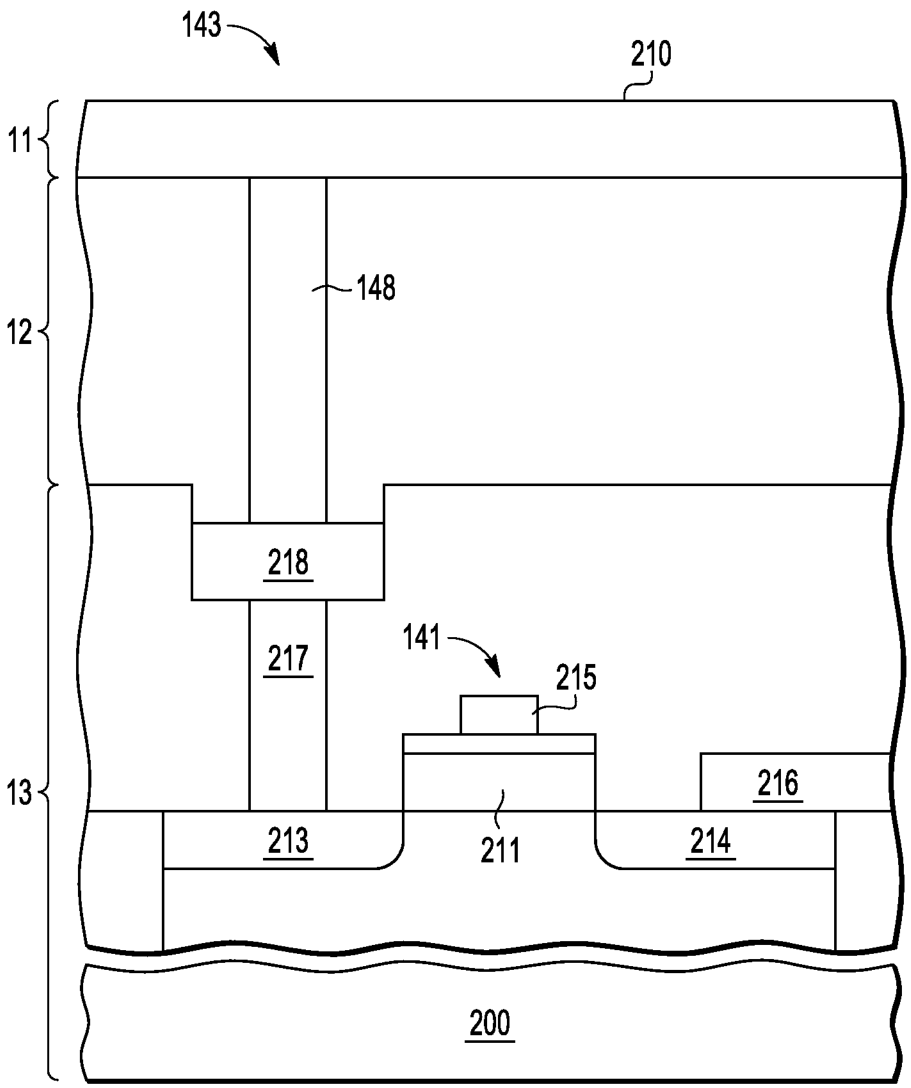
FIG. 4 is a cross-sectional view of a portion of the integrated package of FIG. 1 in accordance with a specific embodiment of the present disclosure.

FIG. 4 illustrates a cross-sectional view of a portion of the integrated package 10 that illustrates signal feed location 143 of conductive level 11 connected to signal feed 148, which is a conductive interconnect through a dielectric portion of interconnect level 12. The signal feed 148 is connected to a conductive structure of control level 13 that includes a landing 218 recessed below a passivation layer and an inter-level interconnect 217. The inter-level interconnect 217 is connected to a source/drain region 213 of switch 141 that further includes a source/drain region 214 and a gate structure 211 formed over a channel region. The switch 141 can be part of the control module 160 at control level 13 and can be connected to other features, such as other transistors or signal reference structures, by conductive interconnects 215 and 216, which are intra level interconnects connected to gate 211 and to source/drain region 214 of switch 141, respectfully. One skilled in the art will appreciate that the signal feed 148 and inter-level interconnect 217 can be implemented using additional features. For example, the interconnect between landing 218 and source/drain region 213 can includes additional inter-level interconnects that connect to intra level interconnects.

Figure 5:
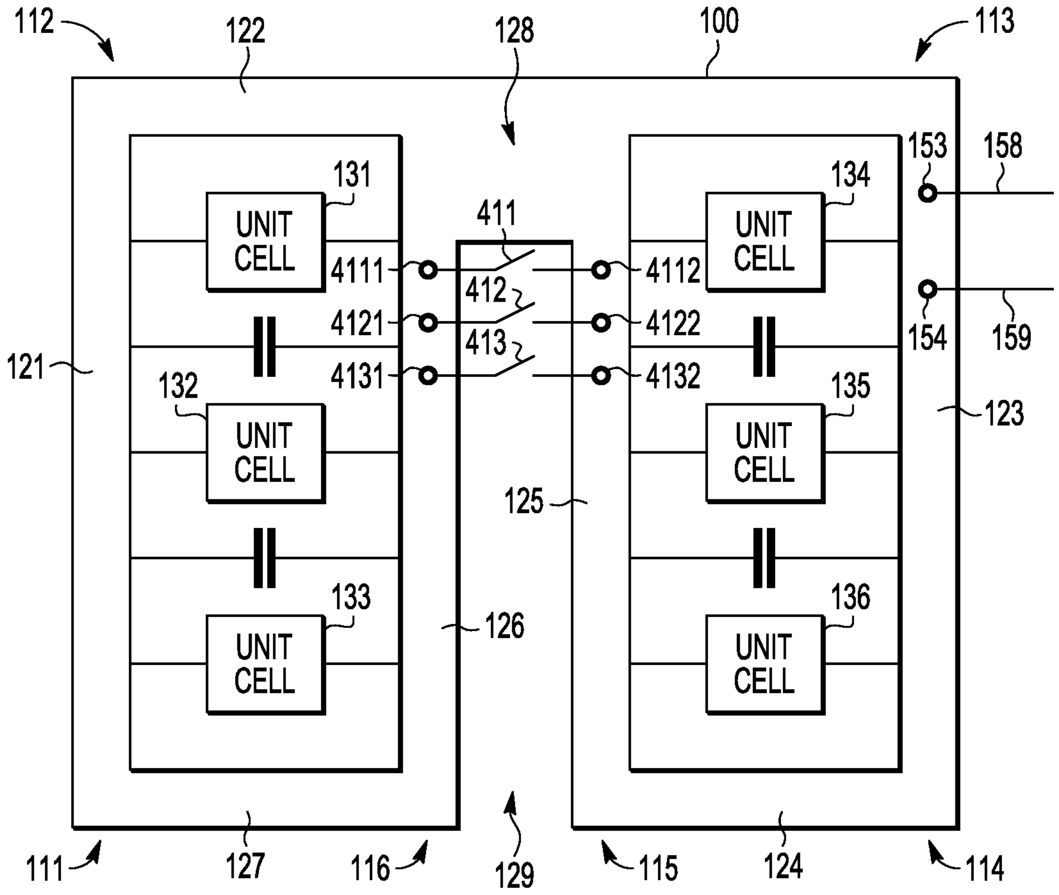
FIG. 5 is a schematic top view of the integrated package of FIG. 1 illustrating a plurality of selectable center taps in accordance with a specific embodiment of the present disclosure.

FIG. 5 illustrates a specific embodiment of the present disclosure whereby an antenna implemented at integrated package 10 includes a plurality of selectable switches 411-413 connected between perimeter line 125 and perimeter line 126. Similar features between FIG. 5 and FIG. 2 are similarly numbered. Selecting one or more of the selectable switches 411-413 effectively increases the length of fill portion 128, which in turn modifies a frequency bandwidth characteristic of the antenna. For example, based upon a state of the configurable indicator at storage location 161 (FIG. 2), control module 160 can select various combinations of switches 411-413, such as switch 411, switches 411 and 412, or switches 411-413 to modify the antenna's center frequency. The ability to selectively adjust the center frequency of the antenna by enabling one or more of switches 411-413 facilitates tuning of the antenna to narrow frequency sub-bands, such as can be encountered with various communication protocols, such as Bluetooth and 802.11 protocols. The antenna can also be configured to implement center frequency diversity to achieve better band edge matching of the antenna under disadvantaged conditions by alternating which of switches 411-413 are selected during operation to facilitate hopping around a center frequency.

Figure 6:
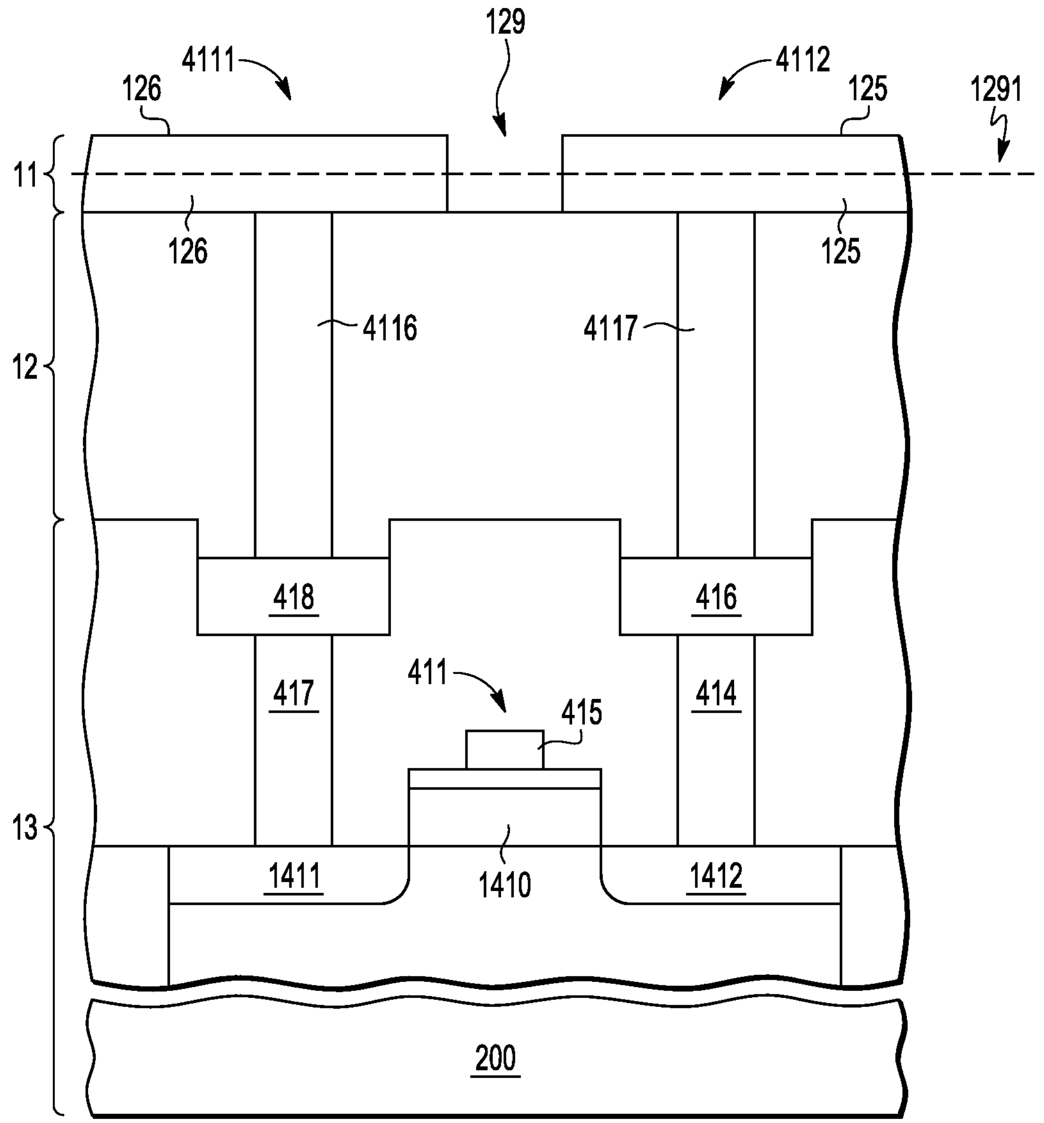
FIG. 6 is a cross-sectional view of a portion of the integrated package of FIG. 1 accordance with a specific embodiment of the present disclosure.

FIG. 6 illustrates a cross-sectional view of a portion of the integrated package 10 that illustrates switch 411 connected between location 4111 and location 4112 of conductive structure 100. The location 4111 is connected to one end of bypass feed 4116. The other end of bypass feed 4116 is connected to a conductive structure of control level 13 that includes a landing 418 and an inter-level interconnect 417. The inter-level interconnect 417 is connected to a source/drain region 1411 of switch 411, which is implanted as a field effect transistor that further includes a source/drain region 1412, and a gate structure 1410 formed over a channel region. The location 4112 of conductive structure 100 is connected to one end of bypass feed 4117. The other end of bypass feed 4117 is connected to a conductive structure of control level 13 that includes a landing 416 and an inter-level interconnect 414. The inter-level interconnect 414 is connected to the source/drain region 1412 of switch 411. The switch 411 can be part of control module 160 at control level 13, whereby the conductive state of switch 411 is controlled by a signal transmitted via conductive interconnect 415. Note that an imaginary line 1291 drawn through location 4111 of perimeter line 126 and through location 4112 of perimeter line 125 intersects gap 129, such that the conductive structure 100 is not continuous along the imaginary line due to the intervening gap 129.

Figure 7:
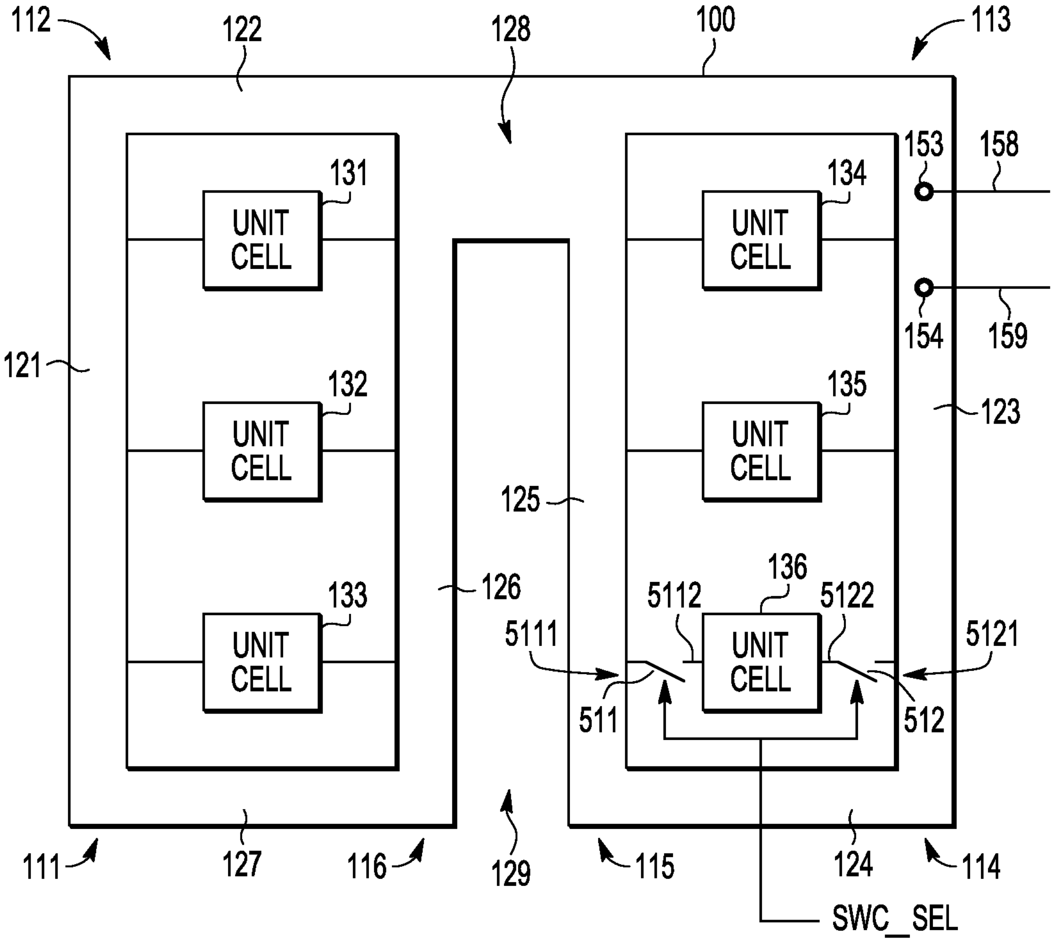
FIG. 7 is a schematic top view of the integrated package of FIG. 1 illustrating a selectable slow-wave cell in accordance with a specific embodiment of the present disclosure.

FIG. 7 illustrates a specific embodiment of the present disclosure whereby an antenna implemented at integrated package 10 includes a switch 511 and a switch 512 that are controlled to modify a frequency bandwidth characteristic and a frequency gain characteristic of an antenna at the integrated package. A frequency bandwidth characteristic refers to a frequency range for which an antenna meets a certain gain requirement, whereby the larger the frequency bandwidth of an antenna, the larger the range of frequencies at which the antenna can transmit and receive signals while meeting the gain requirement. A frequency gain characteristic refers to an amount of gain provided by an antenna at a certain frequency or frequency range.

Switch 511 includes a first data terminal connected to perimeter line 125 at location 5111, a second data terminal connected to a terminal of slow-wave cell 136 at location 5112, and a control terminal connected to receive a signal labeled SWC_SEL that controls the conductive state of switch 511. Switch 512 includes a first data terminal connected to perimeter line 123 at location 5121, a second data terminal connected to a second terminal of slow-wave cell 131 at location 5122, and a control terminal connected to receive the signal SWC_SEL. Note that similar features between FIG. 7 and FIG. 2 are similarly numbered, and the antenna illustrated at FIG. 7 is illustrated to have a single feed-end. Note also that locations 5111, 5112, 5121, and 5122 are illustrated in the layout view of slow-wave cell 131 at FIG. 3, and that gaps that would reside between locations 5111 and 5112 of conductive structure 100, and between locations 5121 and 5122, are not illustrated at FIG. 3.

In operation, slow-wave cell 136 is selectively connected, i.e., electrically connected, between perimeter line 125 and perimeter line 123 responsive to control module 160 asserting signal SWC_SEL. Control module 160 asserts signal SWC_SEL based upon the configurable indicator at storage location 161 to place switch 511 and switch 512 in high-conductivity states. Conversely, based upon the configurable indicator at storage location 161, slow-wave cell 136 can be selectively disconnected, i.e., electrically isolated from one or both perimeter lines 125 and perimeter line 123 responsive to control module 160 negating signal SWC_SEL.

The ability to selectively connect a slow-wave cell to the perimeter lines facilitates tuning a frequency bandwidth characteristic and a gain characteristic of the antenna, whereby when a slow-wave cell is disconnected, i.e., the switches 511 and 512 are placed in a high-impedance state, a frequency bandwidth of the antenna increases while a frequency gain of the antenna decreases, as compared to when the slow-wave cell is connected, i.e., the switches 511 and 512 are placed in a high-conductivity state.

The antenna of integrated package 10 can be configured to implement bandwidth and gain diversity by alternately connecting and disconnecting one or more slow-wave cells, such as slow-wave cell 136, during operation. It will be appreciated that some or all of the other slow-wave cells of FIG. 7 can also be configured to be selectable, whereby the number of slow-wave cells selected can be varied to affect the bandwidth and gain of the antenna. For example, when a plurality of selectable feed-ends are implemented at the antenna, as described previously at FIG. 2, the slow-wave cell that is connected to the same perimeter line as the signal feed, and is furthest from the signal feed, can be selectively disconnected. To illustrate, when the feed-end is at the end that is closest to corner 111, the slow-wave cell 131 can be selectively disconnected from the perimeter lines 121 and 126, while all other slow-wave cells remain electrically connected to their associated perimeter lines.

Figure 8:
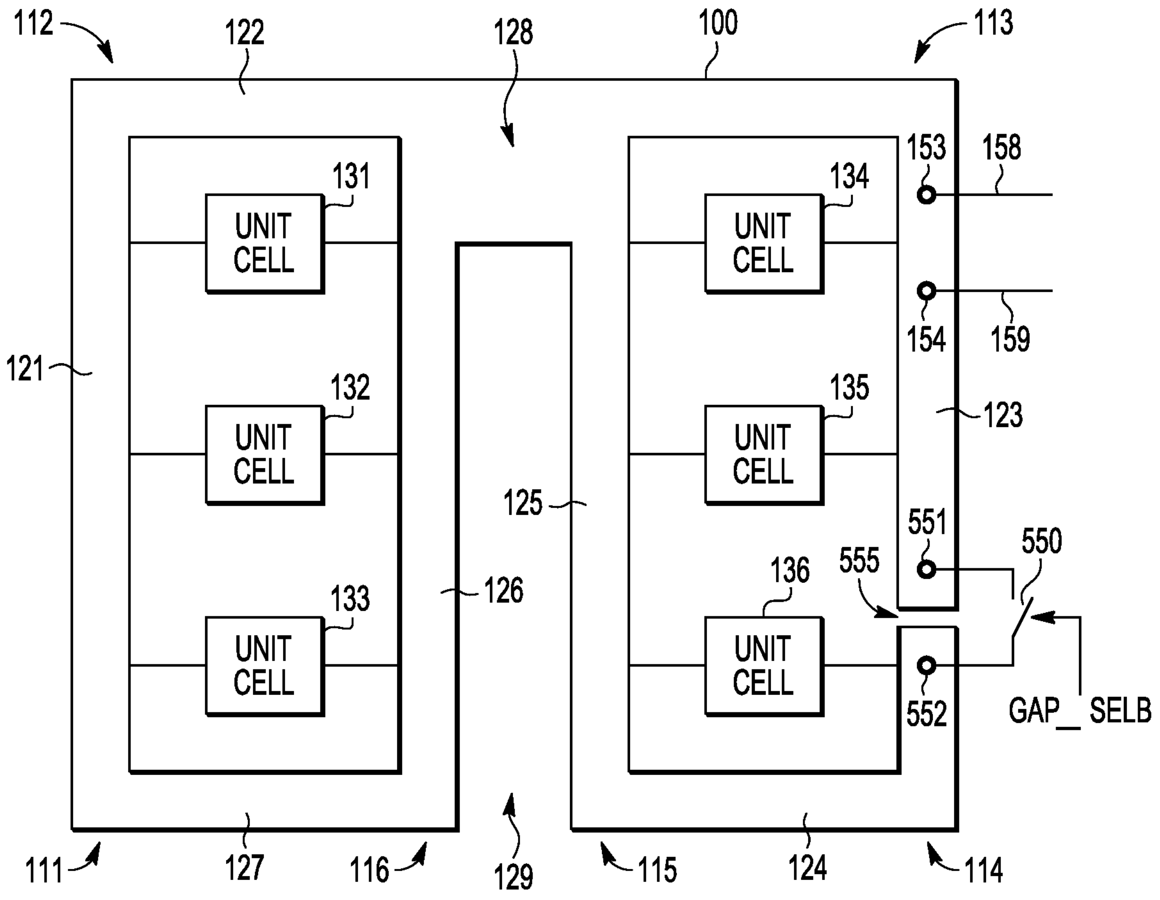
FIG. 8 is a schematic top view of the integrated package of FIG. 1 illustrating a selectable perimeter line gap in accordance with a specific embodiment of the present disclosure.

FIG. 8 illustrates a specific embodiment of the present disclosure that includes a gap 555 in perimeter line 123 that can be selectively bypassed using switch 550. Note that similar features between FIG. 8 and FIG. 2 are similarly numbered, and that the antenna illustrated at FIG. 8 is illustrated to have a single feed-end. Gaps, such as gap 555, are known to effectively slow the propagation of RF signals, and, therefore, increase the bandwidth of an antenna for a given length of the gap. A length of gap 555 can be, for example, about 1.0 mm for a 5 GHz signal. Switch 550 includes a first data terminal connected to one side of gap 555, a second data terminal connected to the other side of gap 555, and a control terminal connected to receive a signal labeled GAP_SEL. Signal GAP_SEL is provided by control module 160, based upon a configurable indicator, and controls the conductive state of switch 550.

The ability to selectively bypass or not bypass gap 555 facilitates tuning of the antenna's bandwidth and gain characteristics, whereby when gap 555 is bypassed by placing switch 550 in a high-conductivity state, the bandwidth of the antenna decreases while its gain increases, as compared to when the gap 555 is not bypassed by placing switch 550 in a high-impedance state. The antenna can be configured to implement bandwidth and gain diversity by alternately bypassing and not bypassing gap 555 during operation. It will be appreciated that additional gaps can be implemented at the perimeter trace of the conductive structure. For example, a selectable gap can be implemented at a perimeter line location near where a selectable slow-wave cell is implemented to facilitate tuning the antenna by removing a slow-wave cell while not bypassing a corresponding gap.

In operation, gap 555 is selectively implemented, i.e., electrically bypassed or not electrically bypassed, based upon a configurable indicator, in response to control module 160 asserting signal GAP_SELB to place switch 550 in a high-impedance state. Conversely, gap 555 is selectively bypassed by negating signal GAP_SELB to place switch 550 in a high-conductivity state. The antenna can be configured to implement bandwidth and gain diversity by alternately implementing and bypassing gap 550.

Figure 9:
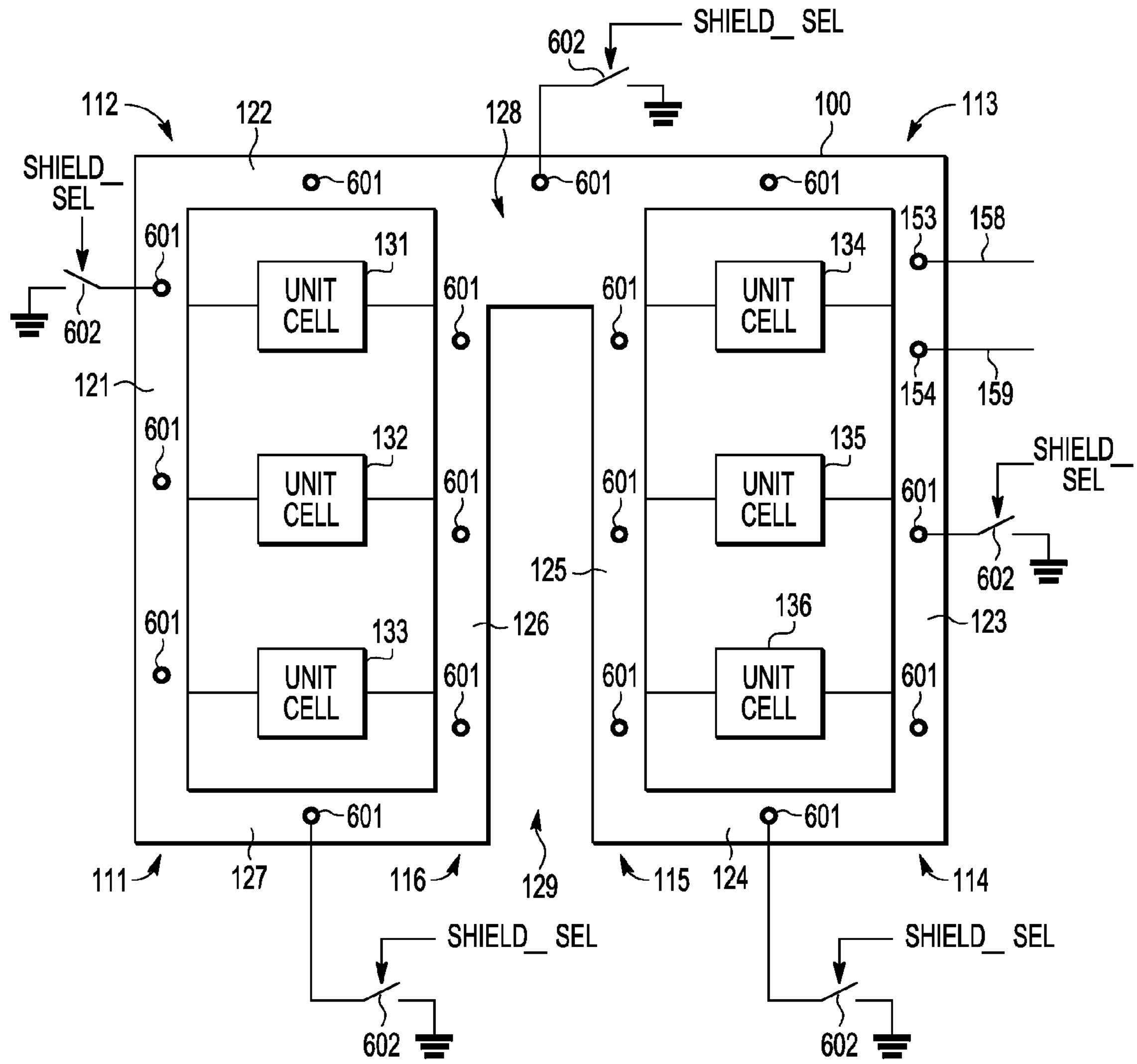
FIG. 9 is a schematic top view of the integrated package of FIG. 1 illustrating a plurality of selectable voltage reference locations in accordance with a specific embodiment of the present disclosure.

FIG. 9 illustrates a specific embodiment of the present disclosure that includes a plurality of ground reference locations 601 that can be selectively connected as a group to ground or another voltage reference, responsive to a configuration indicator. Connecting ground reference locations 601 to ground configures conductive structure 100 as a radiation shield instead of as a radiating element. The ability to ground conductive structure 100 at a plurality of locations during a shielding mode of operation creates a radiation shield that reduces the amount of radiation that is transmitted by conductive structure 100. For example, the amount of radiation generated by circuitry at control level 13 during operation that is transmitted outside of integrated package 10 is reduced when conductive structure 100 is shielded.

It will be appreciated that each of the ground reference locations 601 is connected to ground through a corresponding switch 602. For clarity of illustration only four switches 602 are illustrated at FIG. 9 as connected to their corresponding ground reference locations 601 at FIG. 9. Switches 602 associated with ground reference locations 601 can be selectable as a group, whereby each switch is placed in a high-conductivity state responsive to a signal SHIELD_SEL being asserted by control module 160, and placed in a high-impedance state responsive to signal SHIELD_SEL being negated. Control module 160 can determine whether to operate conductive structure 100 as a radiation shield or a radiation element based upon the configurable indicator at storage location 161 indicating a transceive mode or a shield mode of operation.

Figure 10:
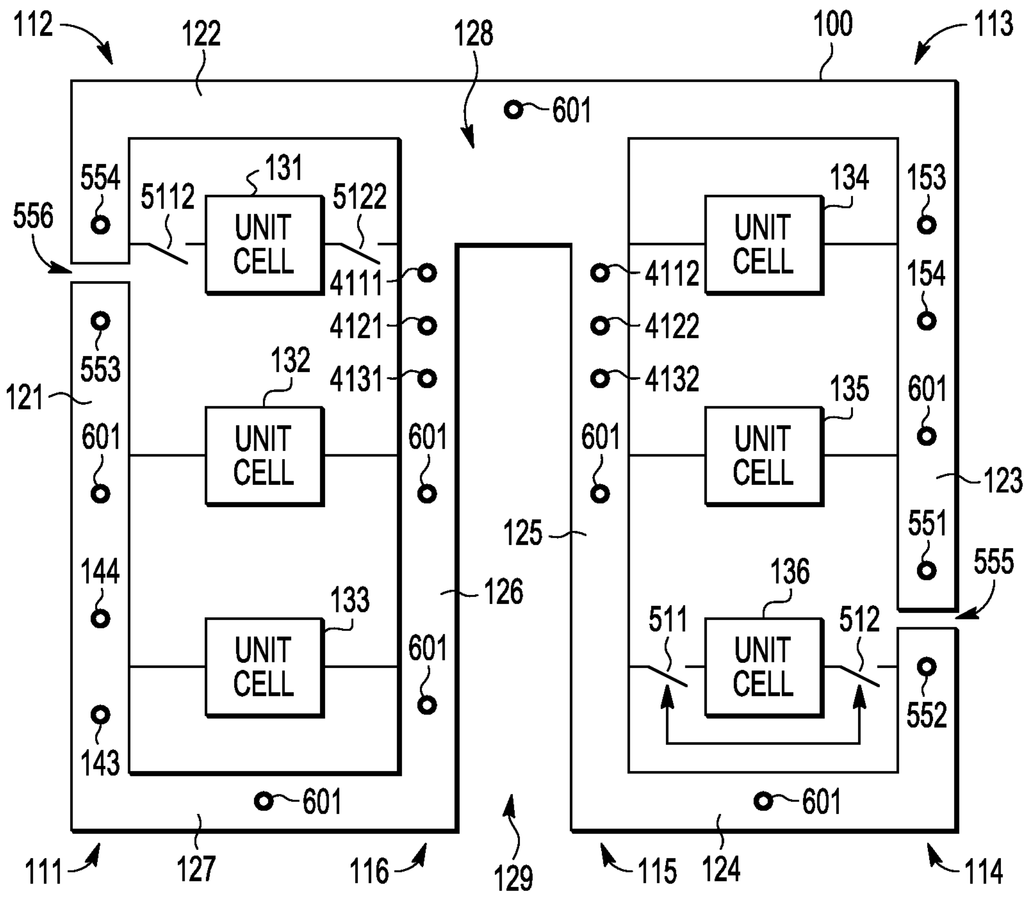
FIG. 10 is a schematic top view of the integrated package of FIG. 1 illustrating a combination of various selectable features in accordance with a specific embodiment of the present disclosure.

It will be appreciated that the various selectable features described at FIGS. 2-9 have been depicted separately for ease of illustration, and that these selectable features can be implemented together in various combinations at an integrated package. For example, FIG. 10 illustrates a top view of a conductive structure 100 of an integrated package in accordance with a specific embodiment that incorporates at least one of each of the selectable features disclosed previously. For clarity of illustration, the inclusion of a particular feature at the integrated package of FIG. 10 is represented by the inclusion of a reference number that was used in a previous figure to identify a location associated with that particular feature at conductive structure 100. For example, the inclusion of the reference number 153 at FIG. 10 indicates that features associated with location 153 as illustrated at FIG. 2 are implemented at the integrated package represented at FIG. 10, though not specifically illustrated at FIG. 10. Therefore, the inclusion of reference number 153 at FIG. 10 is indicative of signal feed 158 and switch 151 being implemented in the embodiment of FIG. 10. In addition to the features previously illustrated in FIGS. 2-9, FIG. 10 includes additional features including gap 556 and corresponding bypass locations 553 and 554, and slow-wave cell 131 as a selectable cell. Therefore, gap 556 and locations 553 and 554 are associated with similar features as gap 555, such as a bypass switch (not illustrated) similar to switch 550 of FIG. 8, and slow-wave cell 131 is illustrated as being selectable as indicated by switches 5111 and 5112. Note that the control signals that bypass gap 556 and that control selectable switch 131 are different than the corresponding control signals that bypass gap 555 and that control selectable switch 136.

Figure 11:
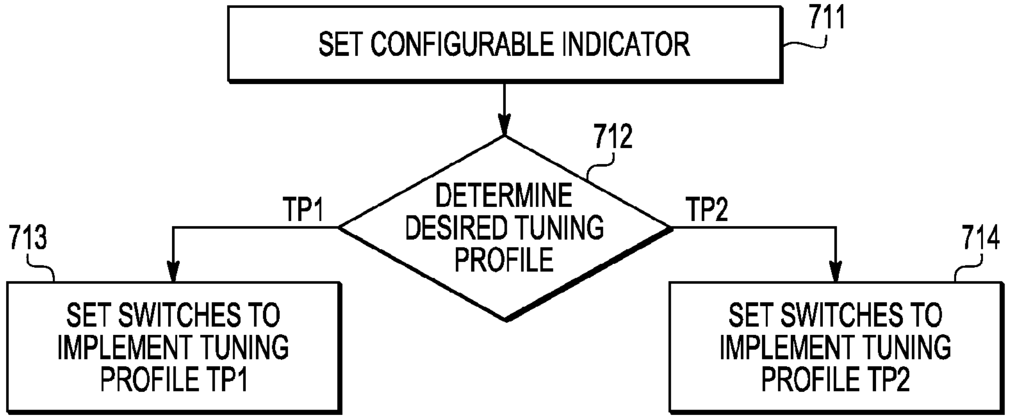
FIG. 11 illustrates a flow diagram of a method in accordance with a specific embodiment of the present disclosure.

FIG. 11 illustrates a method in accordance with a specific embodiment of the present disclosure. At node 711, a configurable indicator is set to indicate which selectable features at an integrated package implementing an antenna in a manner described above are to be selected to implement a desired tuning profile. For example, when the only selectable feature of those selectable features described herein is the selectable signal feeds described at FIG. 3, the configurable indicator can identify one of two tuning profiles: one tuning profile that identifies the signal feed near corner 111 for selection; and another tuning profile that identifies the signal feed near corner 113 for selection. Similarly, for an integrated package implementation where the only selectable feature of those features described herein is slow-wave cell 136, the configurable indicator can identify one of two tuning profiles: one tuning profile that identifies the slow-wave cell for selection, whereby the slow-wave cell is connected to the perimeter trace; and another tuning profile that does not identify the slow-wave cell for selection, whereby the slow-wave cell is disconnected from the perimeter trace. For an implementation of an integrated package where each of the selectable features disclosed herein are implemented (selectable signal feeds, multiple selectable slow-wave cells, selectable center frequency taps selectable perimeter trace gaps) the configurable indicator can identify one of many possible tuning profiles that defines a particular combination features to be selected. The configurable indicator can be programmable during operation.

At node 712, a desired tuning profile for the antenna of the integrated package is determined based upon the configurable tuning indicator. For ease of illustration, only two possible tuning profiles, TP1 and TP2, are illustrated at FIG. 11. It will be appreciated, as discussed above, that depending upon the number of selectable features implemented at the integrated package that there can be more than two tuning profiles. In response to the desired tuning profile being tuning profile TP1 flow proceeds to node 713. Otherwise, in response to the desired tuning profile being tuning profile TP2 flow proceeds to node 714. At node 713, the integrated package configures the switches necessary to implement the antenna at tuning profile TP1. At node 714, the integrated package configures the switches necessary to implement the antenna at tuning profile TP2.

Figure 12:
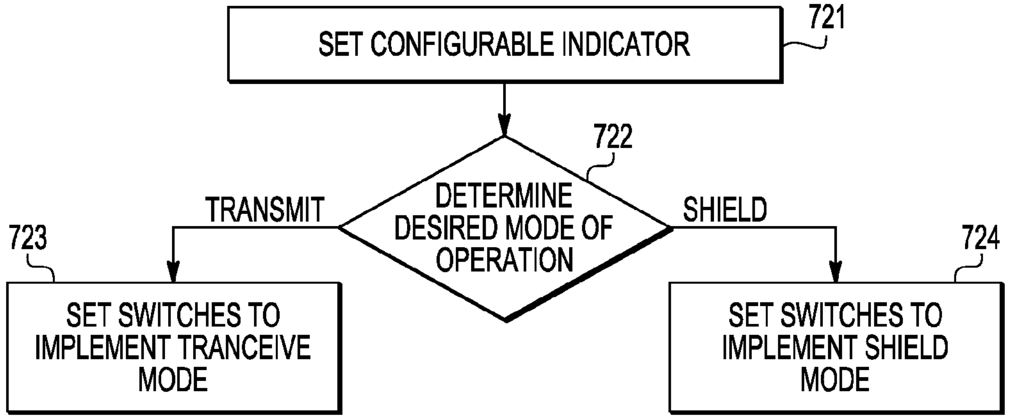
FIG. 12 illustrates a flow diagram of a method in accordance with a specific embodiment of the present disclosure.

FIG. 12 illustrates a method in accordance with a specific embodiment of the present disclosure. At node 721 a configurable indicator is set to indicate whether a conductive structure of the integrated package is to be configured to operate as a radiating element, such as during an RF transmission mode of operation, or as a shielding element, such as during a shielding mode operation. At node 722 the mode of operation of the integrated package is determined based upon the configurable indicator. Flow proceeds from node 722 to node 723 in response to the configurable indicator indicating the conductive structure is to be configured to operate as a radiating element during a transmission mode of operation. Flow proceeds from node 722 to node 724 in response to the configurable indicator indicating the conductive structure is to be configured to operate as shielding element during a shielding mode of operation.

At node 723, the integrated package is configured to communicate a transceive signal between a control module, such as control module 160 of FIG. 2, and a radiating element implemented at conductive structure 100. At node 724, the integrated package is configured to apply a reference voltage, such as ground, at conductive structure 100 to prevent communication of a signal between the control level 13, which includes control module 160, and a radiating element. In accordance with one embodiment of an integrated package, the only selectable feature at the integrated package is whether conductive feature 110 is a radiating element or a shielding element. In accordance with another embodiment, one or more other additional selectable features are implemented at an integrated package along with the ability to select between conductive feature 110 being configured as a radiating element or a shielding element. These other selectable features allow the antenna of the integrated package to be configured at various tuning profiles during a transmission mode of operation as discussed previously.

Figures 13, 14:
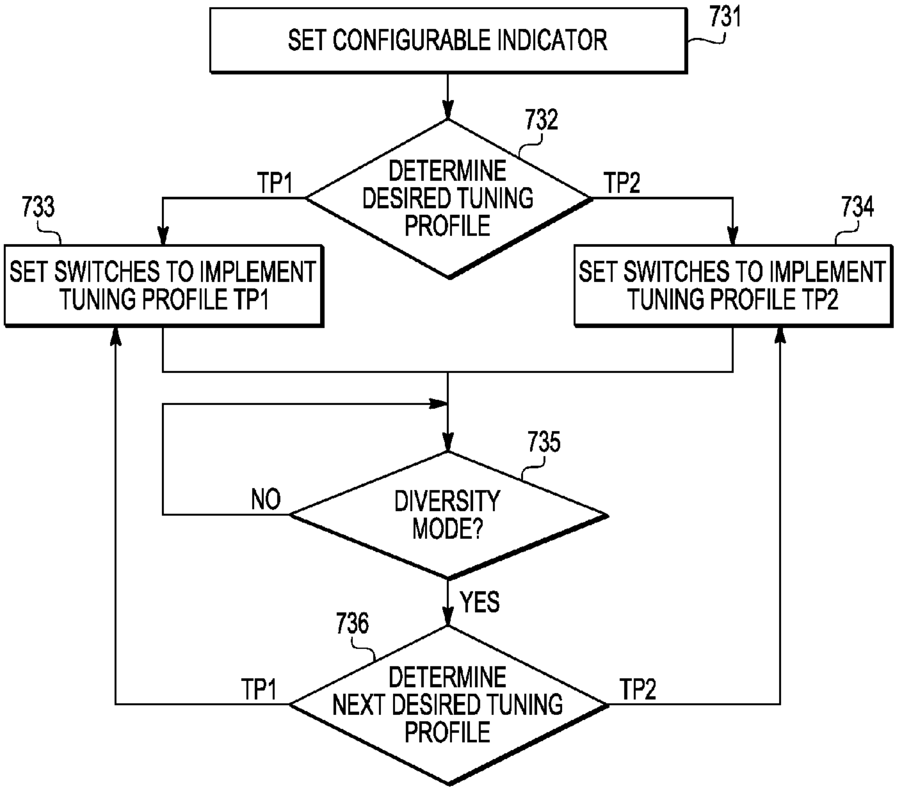
FIG. 13 illustrates a flow diagram of a method in accordance with a specific embodiment of the present disclosure.
FIG. 14 illustrates a table representing different diversity modes for an antenna of the integrated package of FIG. 1.

FIG. 13 illustrates a method in accordance with the present disclosure. At node 731 a configurable indicator is set to indicate a desired tuning profile of an antenna at an integrated package. In addition, the configurable indicator includes a diversity indicator that is set to indicate whether the antenna of the integrated package is to operate in diversity mode, and if so, the diversity indicator is set to indicate various tuning profiles that are implemented during diversity mode.

At node 732, a desired tuning profile for the antenna of the integrated package is determined based upon the configurable indicator. For ease of illustration, only two possible tuning profiles, TP1 and TP2, are illustrated at FIG. 13. It will be appreciated, as discussed above, that depending upon the selectable features implemented at the integrated package that there can be more than two tuning profiles. In response to the desired tuning profile being tuning profile TP1, flow proceeds to node 733. Otherwise, in response to the desired tuning profile being tuning profile TP2 flow proceeds to node 734. At node 733, the integrated package configures the switches necessary to implement tuning profile TP1 at the antenna. At node 734, the integrated package configures to the switches necessary to implement tuning profile TP2 at the antenna. Flow proceeds from node 733 and from node 734 to node 735.

At node 735 it is determined based on the configurable indicator whether diversity is to be implemented by the antenna. If not, flow returns to node 735, otherwise, flow proceeds to node 736 where a next desired tuning profile of a sequence of tuning profiles used to implement antenna diversity is determined, and flow proceeds to either node 733 or 734 based upon the next tuning profile. It will be appreciated that a specific diversity scheme can alternate between two or more tuning profiles. Examples of two different diversity modes are identified by the table of FIG. 14.

The column of the illustrated table that is labeled DESCRIPTION identifies specific selectable features available at an integrated package implementing an antenna in a manner described above. The column labeled SWITCH(ES) indicates the switch or switches associated with the corresponding selectable features identified in the DESCRIPTION column. For example, slow-wave cell 134 is controlled by switch 511 and switch 512.

A first diversity mode, referred to as DIVERSITY 1, that alternates between two tuning profiles is characterized by the two columns under the heading DIVERSITY 1. Each of the two columns associated with DIVERSITY 1 represents a different tuning profile of the antenna of the integrated package that is implemented during sequential diversity phases. The left-most column associated with DIVERSITY 1 indicates the conductive state of the corresponding switch(es), listed under the heading SWITCH(ES), for a particular tuning profile. For example, the conductive states for the switches that configure the selectable features associated with the first tuning profile of DIVERSITY 1 are as follows: slow-wave cell 136 is connected to the perimeter trace as indicated by both switch 511 and switch 512 being placed in a high-conductivity state, indicated by H/H at the table of FIG. 14; slow-wave cell 131 is connected to the perimeter trace as indicated by both switch 5111 and switch 5121 being placed in a high-conductivity state, indicated by H/H at the table of FIG. 14; gap 555 is bypassed as indicated by switch 550 being placed in a high-conductivity state, indicated by H at the table of FIG. 14; gap 556 is bypassed as indicated by its corresponding switch (not illustrated) being placed in a high-conductivity state, indicated by H at the table of FIG. 14; shielding is off as indicated by switches 602 being placed in a low-conductivity state, indicated by an L at the table of FIG. 14; feed location 143 is selected to communicate the transceive signal as indicated by switch 141 being placed in a high-conductivity state, indicated by an H at the table of FIG. 14; feed location 153 is not selected to communicate the transceive signal as indicated by switch 151 being placed in a low-conductivity state, indicated by an L at the table of FIG. 14; and each of the center taps is left open as indicated by each of the switches 411-413 being place in a low-conductivity state, indicated by an L at the table of FIG. 14.

The right-most column under the heading DIVERSITY 1 represents a second tuning profile of the sequence of tuning profiles associated with the first diversity mode whereby each selectable feature of the second tuning profile is the same as for the first tuning profile, except that feed location 143 is not selected to communicate the transceive signal, as indicated by switch 141 being placed in a low-conductivity state, and feed location 153 is selected to communicate the transceive signal, as indicated by switch 151 being placed in a high-conductivity state. Therefore, the antenna implements a specific diversity by being alternately configured in the two tuning profiles indicated at the two columns under the heading DIVERSITY 1. The term "alternately" and its variations as used herein with respect to implementing antenna diversity is intended to mean switching between two or more tuning profiles in any manner, including a periodic repeating manner or in a non-periodic manner.

A second diversity mode, referred to as DIVERSITY 2, that alternates between four tuning profiles is characterized by the columns under the heading DIVERSITY 2. Each of these four columns represents a different tuning profile of the antenna of the integrated package that is implemented during four sequential diversity phases. The left-most column associated with DIVERSITY 2 indicates the conductive state of the corresponding switch(es), listed under the heading SWITCH(ES), for a particular tuning profile implemented as a first diversity phase of DIVERSITY 2. For example, the conductive states for the switches that configure the selectable features associated with the first tuning profile of DIVERSITY 2 are as follows: slow-wave cell 134 is connected to the perimeter trace as indicated by both switch 511 and switch 512 being placed in a high-conductivity state; slow-wave cell 131 is connected to the perimeter trace as indicated by both switch 5111 and switch 5121 being placed in a high-conductivity state; gap 555 is bypassed as indicated by switch 550 being placed in a high-conductivity state; gap 556 is bypassed as indicated by its corresponding switch (not illustrated) being placed in a high-conductivity state; shielding is off as indicated by switches 602 being placed in a low-conductivity state; feed location 143 is selected to communicate the transceive signal as indicated by switch 141 being placed in a high-conductivity state; feed location 153 is not selected to communicate the transceive signal as indicated by switch 151 being placed in a low-conductivity state; and each of the center taps is left open as indicated by each of switches 411-413 being place in a low-conductivity state.

The second column under the heading DIVERSITY 2 indicates the conductive state of the corresponding switches for a second tuning profile implemented as a second diversity phase of DIVERSITY 2, whereby during the second diversity phase each selectable feature is configured in a similar turning profile as during the first diversity phase, except that slow-wave cell 131 has been disconnected from the perimeter trace of the conductive structure, as indicated by switches 5111 and 5121 being placed in a low-conductivity state. As a result, the bandwidth and gain of the antenna are modified to implement bandwidth and gain diversity.

The third column under the heading DIVERSITY 2 indicates the conductive state of the corresponding switches for a third tuning profile implemented as a second diversity phase of DIVERSITY 2, whereby during the second diversity phase each selectable feature is in a similar tuning profile as during the second diversity phase except that the feed location has been switched, as indicated by switch 141 being placed in a low-conductivity state and switch 151 being placed in a high-conductivity state, and slow-wave cell 131 has been connected to the perimeter trace of the conductive structure, as indicated by switches 5111 and 5112 being placed in a high-conductivity state. Spatial diversity is implemented at the antenna, as a result of the feed locations of the antenna being switched, and bandwidth and gain diversity continues to be implemented as a result of the slow-wave cell being re-connected.

The fourth column under the heading DIVERSITY 2 indicates the conductive state of the corresponding switches for a fourth tuning profile implemented as a second diversity phase of DIVERSITY 2, whereby during the second diversity phase each selectable feature is in a similar tuning profile as during the third tuning profile, except that slow-wave cell 131 has been removed, as indicated by switches 5111 and 5112 being placed in a low-conductivity state. As a result, the bandwidth and gain of the antenna are modified to continue to implement bandwidth and gain diversity. The four diversity phases are repeated after completion of the fourth diversity phase.

The characteristics of the antenna implemented at the integrated package are useful for applications in wireless products such as mobile communication handsets, personal digital assistants (PDAs) and laptops that are wirelessly connected to a Local Area Network (LAN) or Personal Area Network. (PAN). This technology can be scaled to various frequencies such as 800 MHz (cellular), 900 MHz (GSM), 1500 MHz (GPS) 1800 MHz (GSM), 1900 MHz (PCS), 2400 MHz (Bluetooth and IEEE standard 802.11), 5200 MHz (IEEE standard 802.11) and higher frequencies.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed.

Also, the concepts have been described with reference to specific embodiments. However, one of ordinary skill in the art appreciates that various modifications and changes can be made without departing from the scope of the present disclosure as set forth in the claims below. For example, in addition to the integrated package being an RCP package, other package types are anticipated, such as a package with an antenna on the lid that is formed by metal stamping and overmolding or created by flex circuits, or an overmolded package with a plated antenna structure on the top surface. In addition, it will be appreciated that an integrated package having conductive structures other than that illustrated. For example, while the antenna described herein is illustrated having perimeter lines that form two rectangular shaped portions, other shaped perimeter trace portions can be formed. For example, oval shaped perimeter trace portions can be formed. Accordingly, the specification and figures are to be regarded in an illustrative rather than a restrictive sense, and all such modifications are intended to be included within the scope of the present disclosure. In addition, it will be appreciated that more or less of the illustrated features can be implemented. For example, additional feed location can be implemented.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A device comprising:

an antenna to communicate a transceive signal through a first selectable signal feed of a plurality of selectable signal feeds responsive to a first configurable indicator identifying the first selectable signal feed, and to communicate the transceive signal through a second selectable signal feed of the plurality of selectable signal feeds responsive to a second configurable indicator identifying the second selectable signal feed, the antenna including a conductive structure including a radiating element that includes a plurality of signal feed locations that are connected to corresponding selectable signal feeds of the plurality of selectable signal feeds, wherein the conductive structure comprises a plurality of slow-wave cells including a slow-wave cell coupled between a first location of a perimeter trace of the radiating element and a second location of the perimeter trace of the radiating element.

2. The device of claim 1, wherein the radiating element further includes a plurality of voltage reference feed locations that are coupled to corresponding selectable voltage reference feeds of a plurality of selectable voltage reference feeds, the plurality of selectable voltage reference feeds are selectable to provide a predefined voltage reference to each of the plurality of voltage reference feed locations.

3. The device of claim 2, wherein the device is an integrated package.

4. The device of claim 3, wherein the integrated package is a redistributed chip package.

5. The device of claim 3 wherein the antenna is a planar antenna.

6. The device of claim 2 further including a switch including a first terminal coupled to a first location of the conductive structure, a second terminal coupled to a second location of the conductive structure, and a control terminal; and a control module coupled to the control terminal of the switch to place the switch in a high-conductivity state to implement a first tuning profile at the antenna or to place the switch in a low-conductivity state to implement a second tuning profile at the antenna.

7. The device of claim 6, wherein the first tuning profile of the antenna includes a greater frequency bandwidth characteristic than the second tuning profile of the antenna.

8. The device of claim 6, wherein the first location is at a perimeter trace of the radiating element, and the second location is at the perimeter trace of the radiating element.

9. The device of claim 1, wherein the conductive structure comprises a plurality of slow-wave cells including a slow-wave cell to be selectively coupled between a first location of a perimeter trace of the radiating element and a second location of the perimeter trace of the radiating element responsive to the first configurable indicator.

10. The device of claim 1, wherein the plurality of selectable signal feeds includes a second selectable signal feed, the antenna to operate as a diversity antenna responsive to the configuration indicator by alternately communicating the transceive signal through the first selectable signal feed and through the second selectable signal feed.

11. A method comprising:

selectively communicating a single transceive signal between a control module and a radiating element of an antenna of an integrated package via a first signal feed location of the radiating element in response to a first configurable indicator identifying the first selectable signal feed, and selectively communicating the single transceive signal between the control module and the radiating element of the antenna via a second signal feed location of the radiating element in response to a second configurable indicator identifying the second selectable signal feed, wherein the antenna comprises a plurality of slow-wave cells including a slow-wave cell to be selectively coupled between a first location of a perimeter trace of the radiating element and a second location of the perimeter trace of the radiating element responsive to the first configurable indicator.

12. The method of claim 11, wherein selectively communicating the transceive signal is responsive to a configurable indicator indicating the integrated package is to operate in a transceive mode of operation, the method further comprising:

in response to the configurable indicator indicating the integrated package is to operate in a shield mode of operation, providing a fixed voltage reference to a plurality of voltage reference feed locations of the radiating element, wherein during the shield mode of operation substantially no radiation is transmitted by the radiating element.

13. The method of claim 11, further comprising:

while selectively communicating the transceive signal via the first signal feed location, modifying a tuning profile of the antenna from a first frequency bandwidth characteristic to a second frequency bandwidth characteristic by modifying a conductive state of one or more switches of the integrated package that are coupled to a conductive structure of the integrated package that includes the radiating element.

14. The method of claim 13 wherein modifying the tuning profile of the antenna to have the second frequency bandwidth characteristic includes:

modifying the conductive state of a switch of the one or more switches that is coupled between a first location and a second location of the conductive structure.

15. The method of claim 13 wherein the first frequency bandwidth characteristic is a frequency range that meets a gain requirement.

16. The method of claim 11, further comprising:

while selectively communicating the transceive signal between the control module and the first signal feed location, modifying a center frequency characteristic of the antenna that includes the radiating element in response to changing a conductive state of one or more switches coupled to a conductive structure that includes the radiating element.

17. An integrated package device including a control module to configure a conductive structure responsive to a configurable indicator to selectively operate in a first configuration as a radiation element of an antenna to communicate signals at a radiation frequency, and in a second configuration as a radiation shield to prevent communication of signals at the radiation frequency, wherein the conductive structure comprises a plurality of slow-wave cells including a slow-wave cell to be selectively coupled between a first location of a perimeter trace of the radiating element and a second location of the perimeter trace of the radiating element responsive to the configurable indicator.

18. The method of claim 11, wherein the antenna comprises a plurality of slow-wave cells including a slow-wave cell to be selectively coupled between a first location of a perimeter trace of the radiating element and a second location of the perimeter trace of the radiating element responsive to the first configurable indicator.

19. The integrated package device of claim 17 further including a switch including a first terminal coupled to a first location of the conductive structure, a second terminal coupled to a second location of the conductive structure, and a control terminal; and the control module coupled to the control terminal of the switch to place the switch in a high-conductivity state to implement a first tuning profile at the antenna or to place the switch in a low-conductivity state to implement a second tuning profile at the antenna.

20. The integrated package device of claim 17, wherein the first tuning profile of the antenna includes a greater frequency bandwidth characteristic than the second tuning profile of the antenna.

* * * * *